(12) United States Patent
Tsai

(10) Patent No.: US 9,148,029 B2
(45) Date of Patent: Sep. 29, 2015

(54) ACTIVE BALANCING CIRCUIT FOR BALANCING BATTERY UNITS

(71) Applicant: Fu-Sheng Tsai, Taoyuan County (TW)

(72) Inventor: Fu-Sheng Tsai, Taoyuan County (TW)

(73) Assignee: Fu-Sheng Tsai, Taoyuan Dist., Taoyuan (TW)

( * ) Notice: Subject to any disclaimer, the term of this patent is extended or adjusted under 35 U.S.C. 154(b) by 183 days.

(21) Appl. No.: 13/940,235

(22) Filed: Jul. 11, 2013

(65) Prior Publication Data

US 2014/0015474 A1 Jan. 16, 2014

Related U.S. Application Data

(60) Provisional application No. 61/671,099, filed on Jul. 13, 2012.

(51) Int. Cl.
*H02J 7/00* (2006.01)
*G06F 17/50* (2006.01)

(52) U.S. Cl.
CPC ........... *H02J 7/0014* (2013.01); *G06F 17/5009* (2013.01); *H02J 7/0016* (2013.01); *H02J 7/0042* (2013.01); *G06F 2217/78* (2013.01)

(58) Field of Classification Search
CPC ........ H05B 33/0803; H02J 9/02; H02J 9/065; H02J 9/061; H02J 7/0014; H02J 7/0016; H02J 7/0042; H02J 7/0068; H02J 7/247; B60R 2021/2359
USPC .................................................. 320/102–108
See application file for complete search history.

(56) References Cited

U.S. PATENT DOCUMENTS

2009/0085515 A1* 4/2009 Bourilkov et al. ............ 320/117
2010/0109608 A1* 5/2010 Buono et al. .................. 320/121
2012/0025754 A1* 2/2012 Xu et al. ........................ 320/103

* cited by examiner

*Primary Examiner* — Binh Tat
(74) *Attorney, Agent, or Firm* — Winston Hsu; Scott Margo

(57) ABSTRACT

A balancing circuit for balancing battery units includes a control unit, an inductor unit and an energy transfer unit. The control unit is coupled to at least one battery unit of the battery units. The control unit includes at least one switch device. The inductor unit is coupled between the switch device and the battery unit, and is arranged for taking away an excess energy of the battery unit according to a switch state of the switch device, and accordingly generating an inductive energy corresponding to the excess energy. The energy transfer unit is coupled to the inductor unit, and is arranged for providing the inductive energy to the battery units and storing the inductive energy.

19 Claims, 5 Drawing Sheets

ACTIVE BALANCING CIRCUIT FOR BALANCING BATTERY UNITS

CROSS REFERENCE TO RELATED APPLICATIONS

This application claims the benefit of U.S. provisional application No. 61/671,099, filed on Jul. 13, 2012, the contents of which are incorporated herein by reference.

BACKGROUND OF THE INVENTION

1. Field of the Invention

The disclosed embodiments of the present invention relate to cell balancing, and more particularly, to an active balancing circuit for balancing battery units by providing the battery units with energy of battery unit(s) having higher voltage(s) in the battery units.

2. Description of the Prior Art

In order to supply a higher output voltage, a plurality of batteries may be coupled in series as a power supply to provide the required output voltage. However, when the power supply having the series-connected batteries is charged, voltage unbalance between the batteries will lower the total energy or damage the power supply. For example, when a part of the batteries in the power supply are fully charged and the rest of the batteries need a period of time to complete charging, continuing charging the power supply may lead to overcharging of the part of the batteries, thereby shortening the life of the part of the batteries.

A conventional power supply uses a passive battery balancing mechanism to prevent overcharging. The passive battery balancing mechanism, however, consumes excess energy (i.e. overcharge energy), resulting in energy waste and excess heat. Thus, an active balancing circuit is needed to solve the above problems.

SUMMARY OF THE INVENTION

It is therefore one objective of the present invention to provide an active balancing circuit, which balances battery units by providing the battery units with energy of battery unit(s) having higher voltage(s) in the battery units, to solve the above problems.

According to an embodiment of the present invention, an exemplary balancing circuit for balancing battery units is disclosed. The exemplary balancing circuit comprises a control unit, an inductor unit and an energy transfer unit. The control unit is coupled to at least one battery unit of the battery units. The control unit comprises at least one switch device. The inductor unit is coupled between the switch device and the battery unit, and is arranged for taking away an excess energy of the battery unit according to a switch state of the switch device, and accordingly generating an inductive energy corresponding to the excess energy. The energy transfer unit is coupled to the inductor unit, and is arranged for providing the inductive energy to the battery units and storing the inductive energy.

The proposed battery balancing circuit may balance a battery system rapidly, and have a modular architecture (e.g. a flyback converter with high power conversion efficiency) to simplify the circuit design and increase the design flexibility. Additionally, the proposed battery balancing circuit may use a free-running oscillator to simplify the control mechanism and reduce the cost.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "coupled" is intended to mean either an indirect or direct electrical connection. Accordingly, if one device is electrically connected to another device, that connection may be through a direct electrical connection, or through an indirect electrical connection via other devices and connections.

Figure 1:
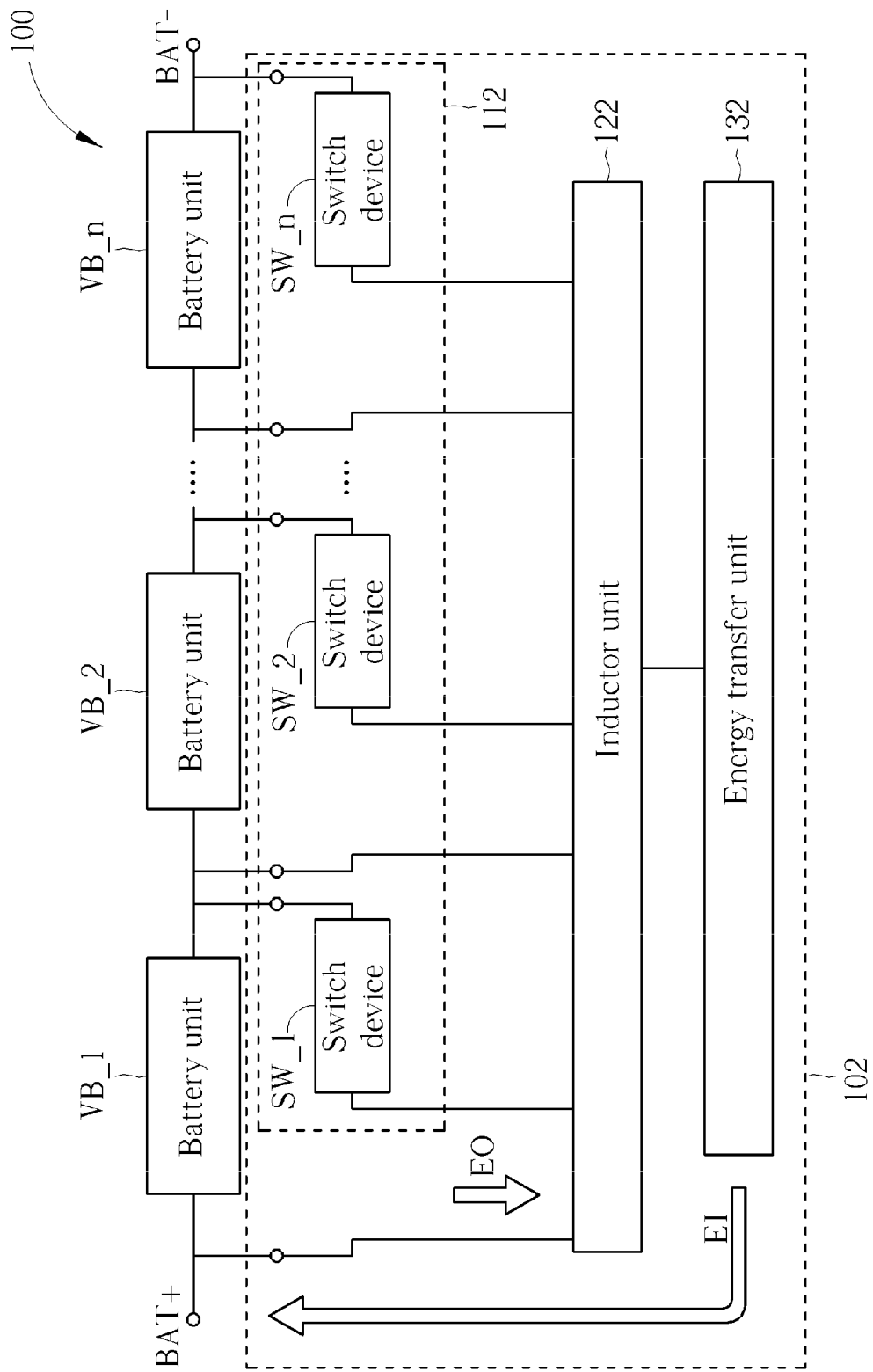
FIG. 1 is an exemplary battery system according to an embodiment of the present invention.

Please refer to FIG. 1, which is an exemplary battery system according to an embodiment of the present invention. The battery system 100 may include a plurality of battery units VB_1-VB_n (n is a positive integer) and a balancing circuit 102 operative for balancing the battery units VB_1-VB_n. The battery units VB_1-VB_n may provide required power for an externally coupled electronic apparatus (not shown in FIG. 1) from a node BAT+ (e.g. a high side terminal) and a node BAT− (e.g. a low side terminal), or receive charging power from the node BAT+ and the node BAT−. When the battery system 100 operates in a charging mode, a discharging mode or an idle mode, the balancing circuit 102 may extract energy of battery unit(s) having higher voltage(s) (i.e. more charges) in the battery units VB_1-VB_n, and then provide the energy for at least one of the battery units VB_1-VB_n to thereby realize battery balancing. In other words, the balancing circuit 102 is an active balancing circuit, which may realize a rapid and high-efficiency battery balancing mechanism by providing energy for battery unit(s) having lower voltage(s) directly.

Specifically, the balancing circuit 102 may include, but is not limited to, a control unit 112, an inductor unit 122 and an energy transfer unit 132. The control unit 112 is coupled to a plurality of battery units VB_1-VB_n and includes a plurality of switch devices SW_1-SW_n, wherein the switch devices SW_1-SW_n are disposed corresponding to the battery units VB_1-VB_n, respectively (i.e. a switch device corresponds to a battery unit). Regarding the switch device SW_1 and the corresponding battery unit VB_1, the inductor unit 122 is coupled therebetween; similarly, regarding the switch device SW_2/SW_n and the corresponding battery unit VB_2/VB_n, the inductor unit 122 is also coupled therebetween. As the switch devices SW_1-SW_n may control the direction of the magnetic flux in the inductor unit 122, switch states of the switch devices SW_1-SW_n may be used to control the energy transmission between the battery units VB_1-VB_n and the inductor 122.

For example, in a case where a voltage of the battery unit VB_1 is too high (e.g. the voltage of the battery unit VB_1 exceeds a maximum rated voltage, or a voltage difference between the battery unit VB_1 and other battery units is too great), the inductor unit 122 may take away an excess energy EO of the battery unit VB_1 according to a switch state of the switch device SW_1, and accordingly generate an inductive energy EI corresponding to the excess energy EO. The inductive energy EI may be provided for the battery units VB_1-VB_n through the energy transfer unit 132 (coupled to the inductor unit 122). In one implementation, the energy transfer unit 132 may transmit the inductive energy EI to the node BAT+ in order to perform voltage balancing upon the battery units VB_1-VB_n. In another implementation, the energy transfer unit 132 may be coupled between the node BAT+ and the node BAT− in order to provide the inductive energy EI for the battery units VB_1-VB_n.

In this embodiment, the inductor unit 122 may store the generated inductor energy EI, and transmit the inductor energy EI to the energy transfer unit 132 according to the switch state of the switch device. The energy transfer unit 132 may include a filter device (not shown in FIG. 1), which may be arranged to reduce/eliminate the appearance of ripples. The energy transfer unit 132 may further store the inductive energy EI to maintain a stable energy supply. Additionally, the energy transfer unit 132 may further adjust the inductor energy EI according to actual requirements, and provide the adjusted inductor energy EI for the battery units VB_1-VB_n.

In an alternative design, the control unit 112 may be coupled to only one of the battery units VB_1-VB_n. For example, the switch device SW_1 may be the only one switch device included in the control unit 112, and the inductor unit 122 is coupled between the switch device SW_1 and the battery unit VB_1 only. In other words, the proposed battery balancing mechanism may be used to perform voltage monitoring and adjustment upon a single battery unit in order to provide an excess energy of the single battery unit for all battery units. Please note that each of the battery units VB_1-VB_n shown in FIG. 1 may be a battery cell (i.e. a single battery), a battery block (i.e. including parallel-connected batteries), a battery module (i.e. including parallel-connected battery blocks) or a battery pack (i.e. including series-connected batteries and parallel-connected batteries).

As shown in FIG. 1, each battery unit may be coupled to a corresponding switch device so that the balancing circuit 102 may be implemented in a modular manner. Please refer to FIG. 2, which is a diagram illustrating a first implementation of the battery system 100 shown in FIG. 1. In this implementation, the battery system 200 includes a plurality of battery units BM_1-BM_n and a balancing circuit 202. By way of example but not limitation, the battery units BM_1-BM_n may be a plurality of battery modules, and balancing circuit 202 may employ the flyback converter configuration to implement the modular architecture. However, a person skilled in the art should understand that the battery units BM_1-BM_n are not limited to the battery modules, and the architecture of the balancing circuit 202 is not limited to the flyback converter configuration.

Similarly, the battery units BM_1-BM_n are connected in series between the node BAT+ and the node BAT−, and may provide power or receive charging power from the node BAT+ and the node BAT−. The balancing circuit 202 includes a control unit 212, which includes a plurality of switch devices Q_1-Q_n. The switch devices Q_1-Q_n are implemented by a plurality of a plurality of transistors (having a plurality of body diodes BD1_1 and BD1_n), respectively. By way of example but not limitation, at least one of the switch devices Q_1-Q_n may be implemented by a metal-oxide-semiconductor field-effect transistor (MOSFET). The balancing circuit 202 may further include an inductor unit 222 and an energy transfer unit 232. The inductor unit 222 includes a primary side and a secondary side, wherein the primary side includes a plurality of first windings LP_1-LP_n, and the secondary side includes a plurality of second windings LS_1-LS_n. The energy transfer unit 232 includes a plurality of diodes ED_1-ED_n and a plurality of capacitors C_1-C_n. In this implementation, the control unit 112 shown in FIG. 1 may be implemented by the control unit 212, the inductor unit 122 shown in FIG. 1 may be implemented by the inductor unit 212, and the energy transfer unit 132 shown in FIG. 1 may be implemented by the energy unit 232.

Figure 2:
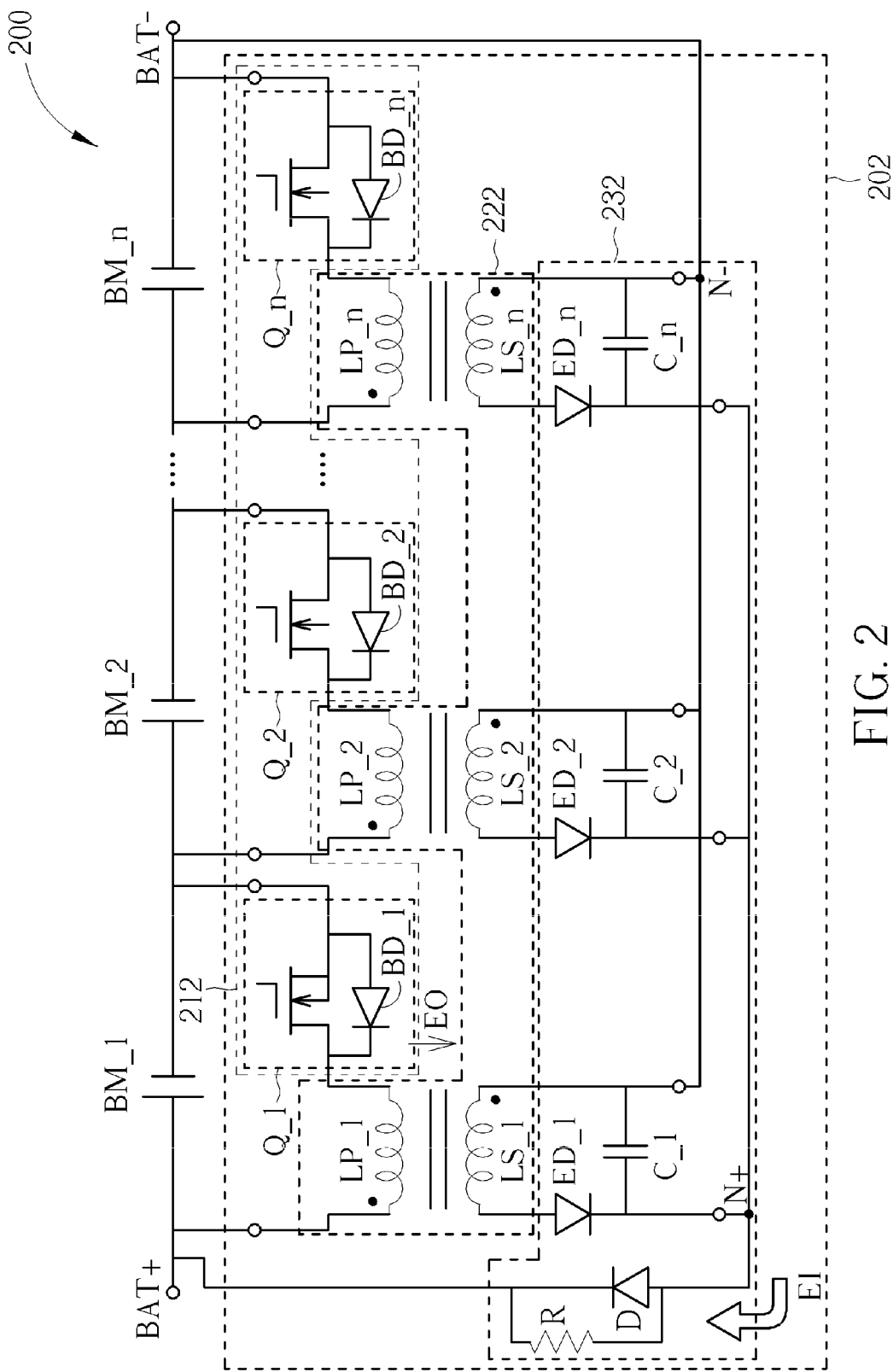
FIG. 2 is a diagram illustrating a first implementation of the battery system shown in FIG. 1.

As shown in FIG. 2, each first winding of the inductor unit 222 is coupled between a corresponding switch device and a corresponding battery unit, and each second winding is inductively coupled to a corresponding first winding. The diodes ED_1-ED_n are coupled to the second windings LS_1-LS_n, respectively, wherein two terminals of each diode are coupled to a corresponding capacitor and a corresponding second winding, respectively (i.e. each diode is coupled between the corresponding capacitor and the corresponding second winding), and two terminals of each capacitor are coupled to a corresponding diode and a corresponding second winding, respectively (i.e. each capacitor is coupled between the corresponding diode and the corresponding second winding). Specifically, each battery unit may be regarded as being coupled to a circuit module having the flyback converter configuration. For example, the battery unit BM_1 is coupled to a flyback converter circuit having the switch device Q_1, the first winding LP_1, the second winding LS_1, the diode ED_1 and the capacitor C_1.

The energy transfer unit 232 may further include an impeditive element (i.e. a resistor R in this embodiment) and a diode D, wherein both the resistor R and the diode D are coupled between the node BAT+ and the node N+. The energy transfer unit 232 is electrically connected to the node BAT+ through the resistor R/the diode D. In other words, the inductive energy EI may be provided for the battery units BM_1-BM_n through a transmission path including the resistor R and the diode D. One advantage is that each of the capacitors C_1-C_n included in the energy transfer unit 232 may be pre-charged though the resistor R (or the impeditive element), and undesired surge current will not be generated during the operation of the balancing circuit 202. In other words, the balancing circuit 202 need not employ a soft start mechanism to eliminate/reduce the surge current, thereby simplifying the circuit design and reducing the cost. Additionally, pre-charging the capacitors C_1-C_n may enhance the speed of the circuit operation.

When the diode D conducts, the node BAT+ and the node N+ may be regarded as being at equal potential. As the capacitors C_1-C_n are connected in parallel between the node N+ and the node BAT−, the capacitors C_1-C_n may be regarded as being connected in parallel between the node BAT+ and the node BAT−. Hence, energies stored in the capacitors C_1-C_n (i.e. the energy stored in the energy transfer unit 232) may circulate therebetween and be provided for all battery units.

Please note that the above is for illustrative purposes only, and is not meant to be a limitation of the present invention. In an alternative design, the resistor R and the diode D may be coupled between the node BAT− and the node N−. In another alternative design, it is feasible to omit at least one of the resistor R and the diode D. Additionally, the aforementioned impeditive element (e.g. the resistor R) and the diode (e.g. the diode D) may be disposed in the battery system 100 shown in FIG. 1 to enhance the efficiency of the battery balancing mechanism.

Consider the case where a voltage of the battery unit BM_1 is too high (e.g. the voltage of the battery unit BM_1 exceeds a maximum rated voltage, or a voltage difference between the battery unit BM_1 and other battery units is too great). When the switch device Q_1 switches from a turn-off state to a turn-on state, an excess energy EO of the battery unit BM_1 may be converted into an inductive energy EI which will be stored in the first winding LP_1. Next, when the switch device Q_1 switches back to the turn-off state, the inductive energy EI may be transmitted to the energy transfer unit 232 (e.g. the capacitors C_1-C_n) due to the coupling between the first winding LP_1 and the second winding LS_1, and provided for the battery units BM_1-BM_n through the transmission path including the resistor R and the diode D. As a person skilled in the art of the flyback converter circuit should readily understand the operation of aforementioned power conversion/transmission, further description is omitted here for brevity.

In view of the above, by switching the switch state of the switch device corresponding to the battery unit having a higher voltage, the excess energy may be transferred to the energy transfer unit, and the transferred excess energy may be provided for all battery units. Therefore, in addition to providing an excess energy of a single battery unit for all battery units, the proposed battery balancing mechanism may also provide excess energies of a plurality of battery units for all battery units.

Figure 3:
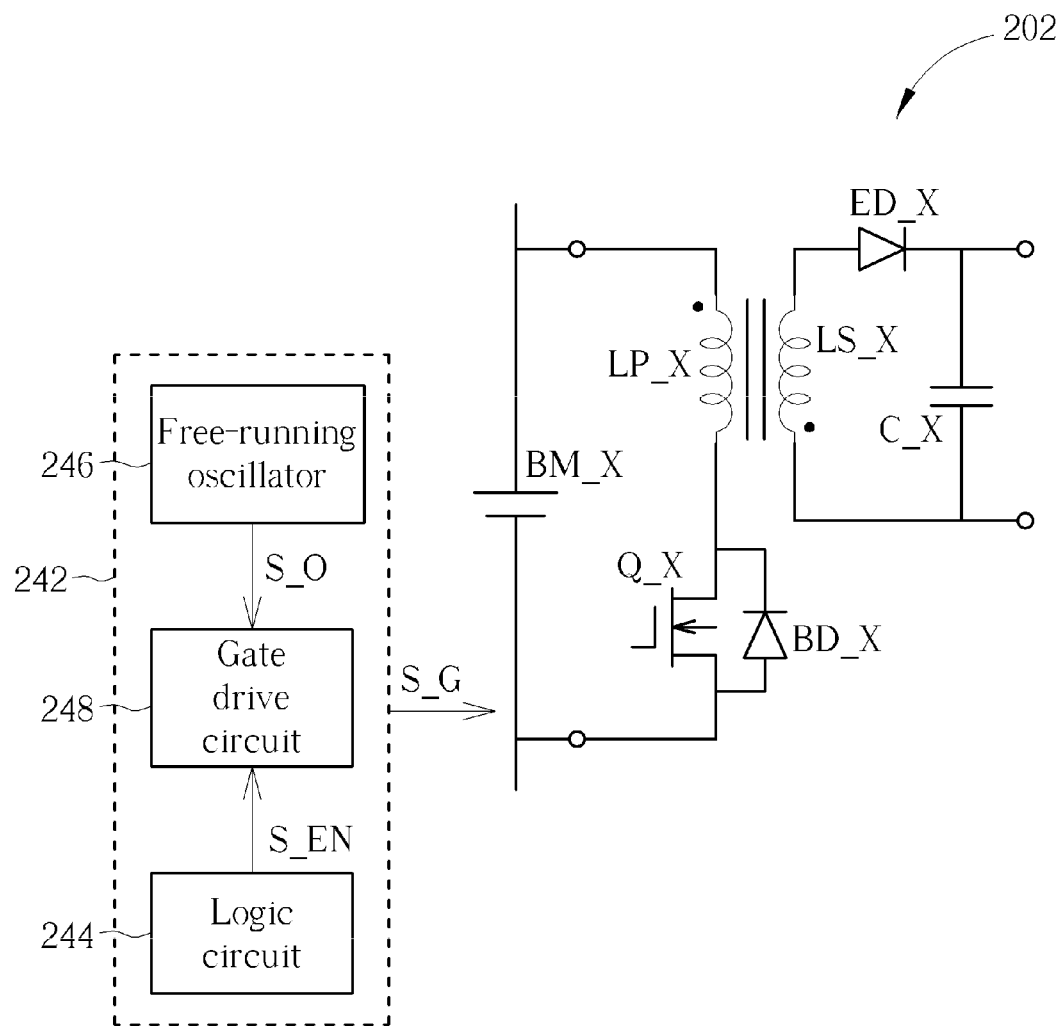
FIG. 3 is a diagram illustrating an implementation of a partial circuit of the balancing circuit shown in FIG. 2.

The switch state of the aforementioned switch device may be controlled by a control circuit. Please refer to FIG. 3 in conjunction with FIG. 2. FIG. 3 is a diagram illustrating an implementation of a partial circuit of the balancing circuit 202 shown in FIG. 2. In this implementation, the balancing circuit 202 further includes a control circuit 242, which is arranged to generate a driving signal S_G to control an operation of the flyback converter circuit coupled to a battery unit BM_x. The battery unit BM_x represents one of the battery units BM_1-BM_n (i.e. the index x is a positive integer from 1 to n). A transistor Q_x (having a body diode BD_x), a first winding LP_x, a second winding LS_x, a diode ED_x and a capacitor C_x are circuit elements included in the flyback converter circuit corresponding to the battery unit BM_x. The control circuit 242 includes a logic circuit 244, a free-running oscillator 246 and a gate drive circuit 248. As the free-running oscillator 246 may self-oscillates, the control unit 242 has the advantage of simplifying the circuit design and reducing the cost. More specifically, the logic circuit 244 may detect voltages of the battery units BM_1-BM_n to obtain voltage information, and generate an enable signal S_EN according to the voltage information. The gate drive circuit 248 may generate the driving signal S_G according to the enable signal S_EN and an oscillation signal S_O generated by the free-running oscillator 246 in order to control the switch state of the switch device Q_x.

For example, when the logic circuit 244 detects that the voltages of the battery units BM_1-BM_n are unbalanced, the enable signal S_EN may have a specific voltage level (e.g. a high level), and the gate drive circuit 248 may generate the driving signal S_G according to the oscillation signal S_O. That is, the driving signal S_G may include frequency and duty cycle information of the oscillation signal S_O. An amount of energy released (or received) from the battery unit BM_x may be controlled by the frequency and the duty cycle of the oscillation signal S_O.

Please note that above architecture of the control circuit 242 shown in FIG. 3 is for illustrative purposes only, and is not meant to be a limitation of the present invention. In alternative design, the free-running oscillator 246 may directly refer to the enable signal S_EN to output the oscillation signal S_O as the driving signal S_G. In an alternative design, the gate drive circuit 248 may directly refer to the enable signal S_EN to generate the driving signal S_G.

Please refer to FIG. 2 again. The balancing circuit 202 may be employed in a high voltage (e.g. higher than 400 volts) battery system or a low voltage (e.g. 20 volts) battery system. In high voltage applications, voltage endurance of circuit elements of the balancing circuit 202 will be increased in order to maintain the normal operation of the battery system. In addition, the normal operation of the battery system may also be maintained by adding an energy adjustment circuit rather than increasing the voltage endurance of the circuit elements. Please refer to FIG. 4, which is a diagram illustrating a second implementation of the battery system 100 shown in FIG. 1. The architecture of the balancing circuit 402 included in the battery system 400 is based on that of the balancing circuit 202 shown in FIG. 2, wherein the main difference is that the balancing circuit 402 further includes an energy adjustment circuit 442_n. The energy adjustment circuit 442_n is coupled to the capacitors C_1-C_n, and is arranged for selectively adjusting the inductive energy EI stored in the capacitors C_1-C_n and providing the adjusted inductive energy EI for a plurality of battery units SBM_1-SBM_n.

In this implementation, when the inductive energy EI is low (e.g. voltages stored in the capacitors C_1-C_n are below 48 volts), the energy adjustment circuit 442_n will not adjust the inductive energy EI. In other words, the battery balancing mechanisms of the balancing circuit 402 and the balancing circuit 202 shown in FIG. 2 are substantially identical/similar when the inductive energy EI is low. In a case where the balancing circuit 402 is employed in the high voltage battery system (i.e. the series-connected battery units SBM_1-SBM_n have a high rated voltage), if the inductive energy EI is too high (e.g. over 48 volts), the energy adjustment circuit 442_n may be arranged to perform a boost conversion upon the inductive energy EI (i.e. the energy adjustment circuit 442_n may be a boost converter circuit), and provide the converted energy for the battery units SBM_1-SBM_n to thereby maintain the normal operation of the battery system.

Specifically, the energy adjustment circuit 442_n may include a first node NA, a second node NB, a third node NC and a fourth node ND. The first node NA and the second node NB are coupled to two terminals of the capacitor C_n, respectively, and the third node NC and the fourth node ND are coupled to the node BAT+ (i.e. a high side terminal) and the node BAT− (i.e. a low side terminal), respectively. Hence, the energy adjustment circuit 442_n may receive the inductive energy EI through the first node NA and the second node NB, and output the adjusted inductive energy EI through the third node NC and the fourth node ND.

Additionally, the energy adjustment circuit 442_n may include a logic unit 446_n and an adjustment unit 448_n. The logic unit 446_n is arranged for determining if the inductive energy EI stored in the capacitors C_1-C_n achieves a predetermined amount of energy and accordingly generating a determination result. The adjustment unit 448_n is coupled to the logic unit 446_n, and is arranged for adjusting the inductive energy EI according to the determination result. For example, the logic unit 446_n may use "voltage threshold with a hysteresis" as the determination logic. When the determination result indicates that the inductive energy EI is beyond a hysteresis band, the adjustment unit 448_n may adjust the inductive energy EI.

The balancing circuit 402 may further include a free-running oscillator 452, which is arranged for generating an oscillation signal S_C to control an energy adjustment of the energy adjustment circuit 442_n. In a case where the energy adjustment circuit 442_n is a boost converter circuit, the energy adjustment circuit 442_n may adjust an increment of the inductive energy EI according to the frequency and the duty cycle of the oscillation signal S_C. In addition, the design concept of the control unit 242 shown in FIG. 3 may be used to implement a control circuit corresponding to the energy adjustment circuit 442_n (not shown in FIG. 4).

Please note that the balancing circuit 402 may further include a plurality of energy adjustment circuits to thereby realize the modular design concept. In the implementation shown in FIG. 4, the capacitors C_1-C_n are coupled to a plurality of energy adjustment circuits 442_1-442_n, respectively, wherein the energy adjustment circuits 442_1-442_n may be activated according to actual design requirements. The energy adjustment circuits 442_1-442_n may include a plurality of logic units 446_1-446_n and a plurality of adjustment units 448_1-448_n. In this implementation, only one of the energy adjustment circuits 442_1-442_n (e.g. the energy adjustment circuit 442_n) needs to be activated in order to realize the aforementioned boost conversion, wherein the unactivated energy adjustment circuits are represented by dashed lines. In another implementation, it is feasible to dispose only one energy adjustment circuit (e.g. the energy adjustment circuit 442_n) in the balancing circuit 402.

Figure 5:
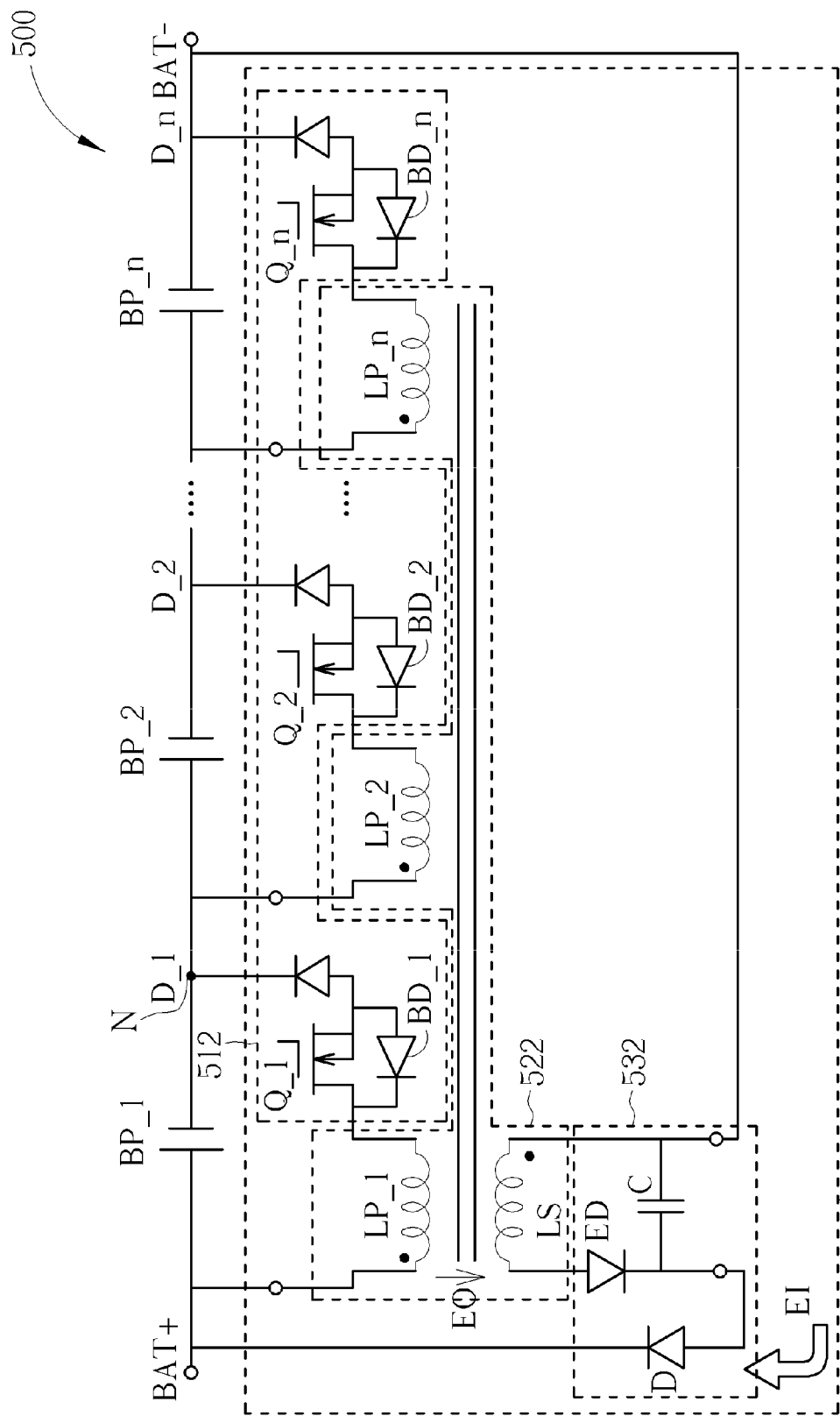
FIG. 5 is a diagram illustrating a third implementation of the battery system shown in FIG. 1.

Please refer to FIG. 5, which is a diagram illustrating a third implementation of the battery system 100 shown in FIG. 1. The architecture of a balancing circuit 502 included in a battery system 500 is based on that of the balancing circuit 202 shown in FIG. 2, wherein the main differences is that the number of the windings and the coupling thereof in the inductor unit. The battery system 500 includes a plurality of battery units BP_1-BP_n (e.g. a plurality of battery packs), a control unit 512, an inductor unit 522 and an energy transfer unit 532. The control unit 512 includes the switch devices Q_1-Q_n shown in FIG. 2. The inductor unit 522 includes a primary side and a secondary side, wherein the primary side includes a plurality of first windings LP_1-LP_n, and the secondary side includes a second winding LS. The second winding LS is coupled to each of the first windings LP_1-LP_n. The energy transfer unit 532 includes a diode ED and a capacitor C, wherein the diode ED is coupled to the second winding LS, and the capacitor C is coupled to the diode ED and the second winding LS. In this implementation, two terminals of the diode ED are coupled to the capacitor C and the second winding LS, respectively (i.e. the diode ED is coupled between the capacitor C and the second winding LS), and two terminals of the capacitor C are coupled to the diode ED and the second winding LS, respectively (i.e. the capacitor C is coupled between the diode ED and the second winding LS).

Similarly, by switching the switch state of the switch device corresponding to the battery unit having a higher voltage, the excess energy may be transferred to the energy transfer unit, and the transferred excess energy may be provided for all battery units. Additionally, the control circuit 242 shown in FIG. 3 may be used to control the switching of the switch devices Q_1-Q_n.

In this implementation, the energy transfer unit 532 further includes the diode D shown in FIG. 2. As a person skilled in the art should understand that the capacitor C may be electrically connected between the node BAT+ and the node BAT− through an impeditive element (e.g. the resistor R shown in FIG. 2) and/or the diode D after reading the paragraphs directed to FIG. 2, the disposition of the impeditive element, the diode D and the capacitor C in the battery system 500, and the advantage thereof are omitted here for brevity.

It should be noted that, as the first windings LP_1-LP_n are coupled to each other, an overcurrent may be generated between battery units when a voltage difference between the battery units is too great. For example, when the excess energy EO taken away by the first winding LP_1 is coupled to the first winding LP_2, and the voltage of the battery unit BP_1 is much greater than that of the battery unit BP_2, the overcurrent may flow from the node N into the switch device Q_1, thereby damaging the battery system 500. Therefore, the control unit 512 may further include a plurality of diodes D_1-D_n in order to prevent/block the overcurrent, wherein each diode (e.g. the diode D_1) is coupled between a corresponding switch device (e.g. the switch device Q_1) and a corresponding battery unit (e.g. the battery unit BP_1).

In an alternative design, the diodes D_1-D_n may be coupled between the first windings LP_1-LP_n and the battery units BP_1-BP_n, respectively. In another alternative design, the diodes D_1-D_n may be coupled between the switch devices Q_1-Q_n and the first windings LP_1-LP_n, respectively. In brief, the switch device included in the control unit may be implemented by a unidirectional switch device in order to prevent/block the overcurrent. As a person skilled in the art should understand the operation of the system 500 shown in FIG. 5 after reading the paragraphs directed to FIG. 1-FIG. 4, further description is omitted here for brevity.

Figure 4:
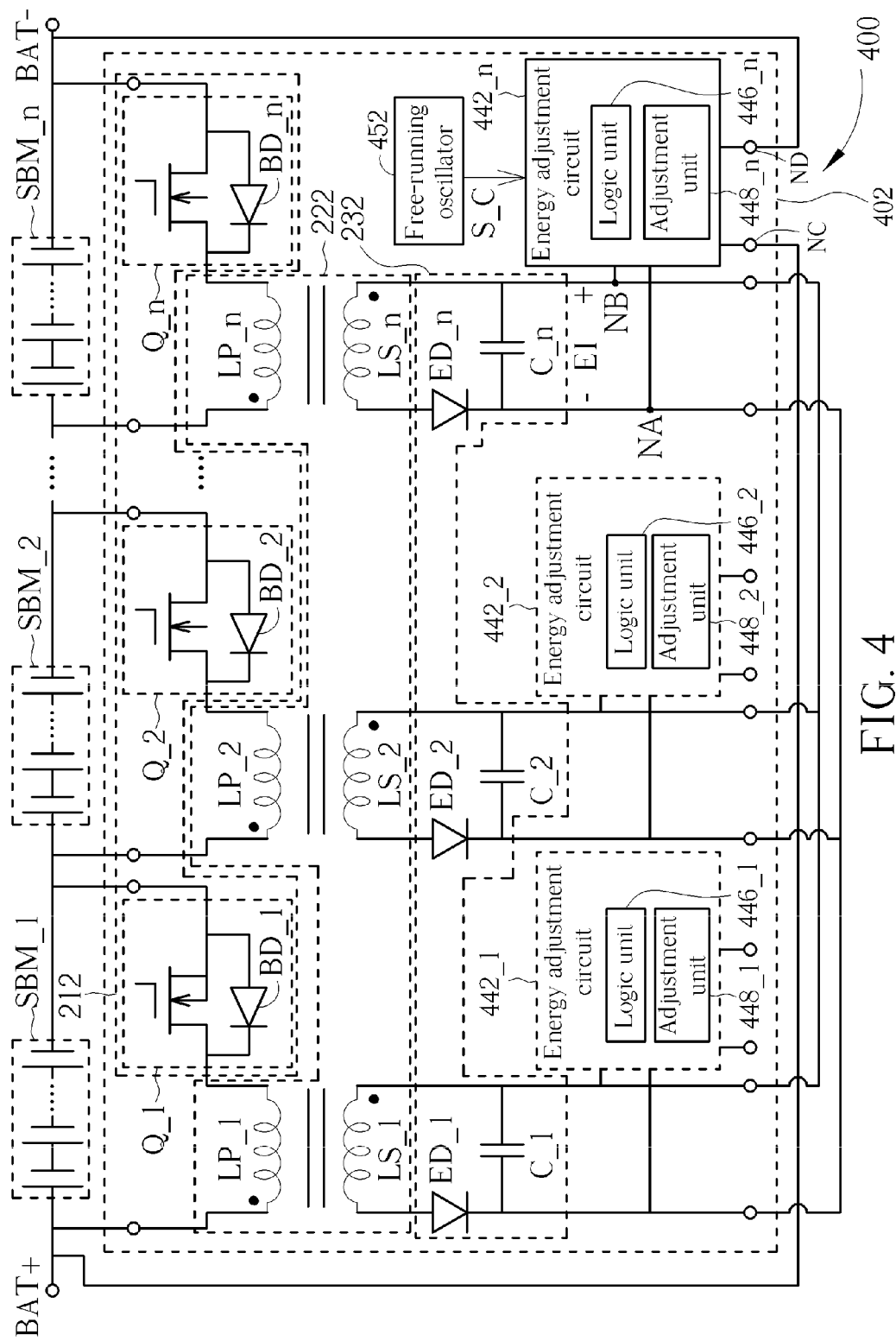
FIG. 4 is a diagram illustrating a second implementation of the battery system shown in FIG. 1.

Please note that the aforementioned unidirectional switch device may be employed in the battery balancing scheme shown in FIG. 1/FIG. 2/FIG. 4. In other words, the control unit 112/212 may also include at least one diode to implement a unidirectional switch device. In addition, battery balancing scheme shown in FIG. 1/FIG. 2/FIG. 4/FIG. 5 may be used to perform the voltage monitoring and adjustment upon a single battery unit in order to provide an excess energy of the single battery unit for all battery units.

To sum up, the proposed battery balancing circuit may balance a battery system rapidly, and have a modular architecture (e.g. a flyback converter with high power conversion efficiency) to simplify the circuit design and increase the design flexibility. Additionally, the proposed battery balancing circuit may use a free-running oscillator to simplify the control mechanism and reduce the cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A balancing circuit for balancing battery units, comprising:
    a control unit, coupled to at least one battery unit of the battery units, wherein the control unit comprises at least one switch device;
    an inductor unit, coupled between the switch device and the battery unit, the inductor unit arranged for taking away an excess energy of the battery unit according to a switch state of the switch device, and accordingly generating an inductive energy corresponding to the excess energy;

an energy transfer unit, coupled to the inductor unit, the energy transfer unit arranged for providing the inductive energy to the battery units and storing the inductive energy; and an energy adjustment circuit, coupled to the battery units and the energy transfer unit, the energy adjustment circuit arranged for selectively adjusting an amount of the inductive energy and providing the adjusted inductive energy for the battery units.

2. The balancing circuit of claim 1, wherein the inductor unit comprises:
a primary side, comprising:
a first winding, coupled to the switch device; and
a secondary side, comprising:
a second winding, coupled to the first winding
wherein the first winding is arranged to store the excess energy as the inductive energy according to the switch state of the switch device, and the inductive energy is transmitted to the energy transfer unit through the second winding.

3. The balancing circuit of claim 2, wherein the control unit further comprises:
at least one diode, wherein the diode is coupled between the switch device and the battery unit, between the first winding and the battery unit, or between the switch device and the first winding.

4. The balancing circuit of claim 2, wherein the energy transfer unit comprises:
a diode, coupled to the second winding; and
a capacitor, coupled to the diode and the second winding, wherein the diode is coupled between the capacitor and the second winding, and the capacitor is coupled between the diode and the second winding.

5. The balancing circuit of claim 4, wherein the battery units are coupled in series between a high side terminal and a low side terminal, and the capacitor is coupled between the high side terminal and the low side terminal.

6. The balancing circuit of claim 1, wherein the battery units are coupled in series between a high side terminal and a low side terminal; the energy adjustment circuit has a first node, a second node, a third node and a fourth node; the first node and the second node are coupled to the energy transfer unit, respectively; and the third node and the fourth node are coupled to the high side terminal and the low side terminal, respectively.

7. The balancing circuit of claim 1, wherein the energy adjustment circuit is a boost converter circuit.

8. The balancing circuit of claim 1, wherein the energy adjustment circuit comprises:
a logic unit, for determining if the inductive energy stored in the energy transfer unit achieves a predetermined amount of energy and accordingly generating a determination result; and
an adjustment unit, coupled to the logic unit, the adjustment unit arranged for adjusting the inductive energy according to the determination result.

9. The balancing circuit of claim 1, further comprising:
a free-running oscillator, for generating an oscillation signal to control an energy adjustment of the energy adjustment circuit.

10. The balancing circuit of claim 1, wherein the battery units are coupled in series between a high side terminal and a low side terminal; the energy transfer unit is electrically connected between the high side terminal and the low side terminal; and the energy transfer unit comprises:
an impeditive element, coupled to one of the high side terminal and the low side terminal; and
a diode, coupled to one of the high side terminal and the low side terminal.

11. The balancing circuit of claim 1, further comprising:
a control circuit, having a free-running oscillator, wherein the free-running oscillator is arranged to generate an oscillation signal, and the control circuit generates a driving signal according to the oscillation signal in order to control the switch state of the switch device.

12. The balancing circuit of claim 1, wherein the control unit is coupled to the battery units; the at least one switch device comprises a plurality of switch devices; the switch devices are disposed corresponding to the battery units, respectively; and the inductor unit comprises:
a primary side, comprising:
a plurality of first windings, wherein each first winding is coupled between a switch device and a battery unit; and
a secondary side, comprising:
a plurality of second windings, coupled to the first windings, respectively; and
the energy transfer unit comprises:
a plurality of diodes, coupled to the second windings, respectively; and
a plurality of capacitors, coupled to the diodes, respectively, and coupled to the second windings, respectively, wherein each diode is coupled between a capacitor and a second winding; each capacitor is coupled between a diode and a second winding; and the capacitors are connected in parallel.

13. The balancing circuit of claim 12, wherein the battery units are coupled in series between a high side terminal and a low side terminal, and the parallel-connected capacitors are electrically connected between the high side terminal and the low side terminal.

14. The balancing circuit of claim 13, wherein the energy transfer unit comprises an impeditive element, and the impeditive element is coupled between the high side terminal and the capacitors or between the low side terminal and the capacitors.

15. The balancing circuit of claim 13, wherein the energy transfer unit comprises a diode, and the diode is coupled between the high side terminal and the capacitors or between the low side terminal and the capacitors.

16. The balancing circuit of claim 1, wherein the control unit is coupled to the battery units; the at least one switch device comprises a plurality of switch devices; the switch devices are disposed corresponding to the battery units, respectively; and the inductor unit comprises:
a primary side, comprising:
a plurality of first windings, wherein each first winding is coupled between a switch device and a battery unit; and
a secondary side, comprising:
a second winding, coupled to each first winding; and
the energy transfer unit comprises:
a first diode, coupled to the second winding; and
a capacitor, coupled to the first diode and the second winding, wherein the first diode is coupled between the capacitor and the second winding, and the capacitor is coupled between the first diode and the second winding.

17. The balancing circuit of claim 16, wherein the battery units are coupled in series between a high side terminal and a low side terminal, and the capacitor is further electrically connected between the high side terminal and the low side terminal.

18. The balancing circuit of claim 17, wherein the energy transfer unit comprises an impeditive element, and the impeditive element is coupled between the high side terminal and the capacitor or between the low side terminal and the capacitor.

19. The balancing circuit of claim 17, wherein the energy transfer unit comprises a second diode, and the second diode is coupled between the high side terminal and the capacitor or between the low side terminal and the capacitor.

* * * * *